United States Patent
Weber et al.

(10) Patent No.: US 7,472,879 B2
(45) Date of Patent: Jan. 6, 2009

(54) POWER SEAT TRACK HAVING A FLEXIBLE SUPPORT ASSEMBLY FOR A LEAD SCREW

(75) Inventors: James Weber, West Bloomfield, MI (US); Scott Lavoie, Red Oak, IA (US)

(73) Assignee: Intier Automotive Inc., Newmarket, Ontario (CA)

( * ) Notice: Subject to any disclaimer, the term of this patent is extended or adjusted under 35 U.S.C. 154(b) by 265 days.

(21) Appl. No.: 10/534,601

(22) PCT Filed: Nov. 13, 2003

(86) PCT No.: PCT/US03/36301

§ 371 (c)(1),
(2), (4) Date: Nov. 17, 2005

(87) PCT Pub. No.: WO2004/043731

PCT Pub. Date: May 27, 2004

(65) Prior Publication Data

US 2006/0261236 A1 Nov. 23, 2006

(51) Int. Cl.
*F16M 13/00* (2006.01)
(52) U.S. Cl. .................................................. 248/429
(58) Field of Classification Search ............... 248/424, 248/330, 430; 297/330, 344.1, 341, 311; 74/89.36, 89.32
See application file for complete search history.

(56) References Cited

U.S. PATENT DOCUMENTS

| | | | |
|---|---|---|---|
| 3,043,552 A | 7/1962 | Colautti | |
| 4,057,114 A | 11/1977 | Anderson | |
| 5,048,786 A | 9/1991 | Tanaka et al. | |
| 5,048,886 A * | 9/1991 | Ito et al. | 296/65.14 |
| 5,292,164 A | 3/1994 | Rees | |
| 5,342,013 A | 8/1994 | Ito et al. | |
| 5,349,878 A * | 9/1994 | White et al. | 74/89.14 |
| 5,447,352 A | 9/1995 | Ito et al. | |
| 5,456,439 A | 10/1995 | Gauger | |
| 5,769,377 A * | 6/1998 | Gauger | 248/429 |
| 5,797,293 A | 8/1998 | Chaban | |
| 5,816,555 A | 10/1998 | Ito et al. | |
| 5,873,558 A | 2/1999 | Sakamoto | |
| 5,938,164 A | 8/1999 | Kargol et al. | |
| 5,941,494 A * | 8/1999 | Garrido | 248/429 |
| 6,021,990 A | 2/2000 | Freund | |
| 6,138,974 A | 10/2000 | Okada et al. | |
| 6,220,642 B1 * | 4/2001 | Ito et al. | 296/65.14 |
| 6,290,199 B1 | 9/2001 | Garrido et al. | |
| 6,808,233 B2 * | 10/2004 | Mallard | 297/344.1 |

* cited by examiner

*Primary Examiner*—Gwendolyn Baxter
(74) *Attorney, Agent, or Firm*—Clark Hill PLC

(57) ABSTRACT

A powered track assembly (20) is provided for allowing selective forward and rearward adjustment of a seat assembly (10) along an interior floor of an automotive vehicle. The upper track (24) is fixedly secured to a bottom portion of the seat assembly (10). A rigid shaft (32) having a generally continuous helical thread (38) is rotatably supported by the upper track (24). A plurality of nuts (40) is threadingly engaged with the shaft (32). A cage (42) having a plurality of compartments (58) is fixedly secured to the lower track (22). Each compartment (58) supports one nut (40) to allow relative rotational movement of the rigid shaft (32) relative to the nuts (40). The nuts (40) are allowed a predetermined amount of movement within the respective compartments (58) to prevent binding between the nuts (40) and the rigid shaft (32) due to relative lateral or vertical movement between the upper and lower tracks.

12 Claims, 6 Drawing Sheets

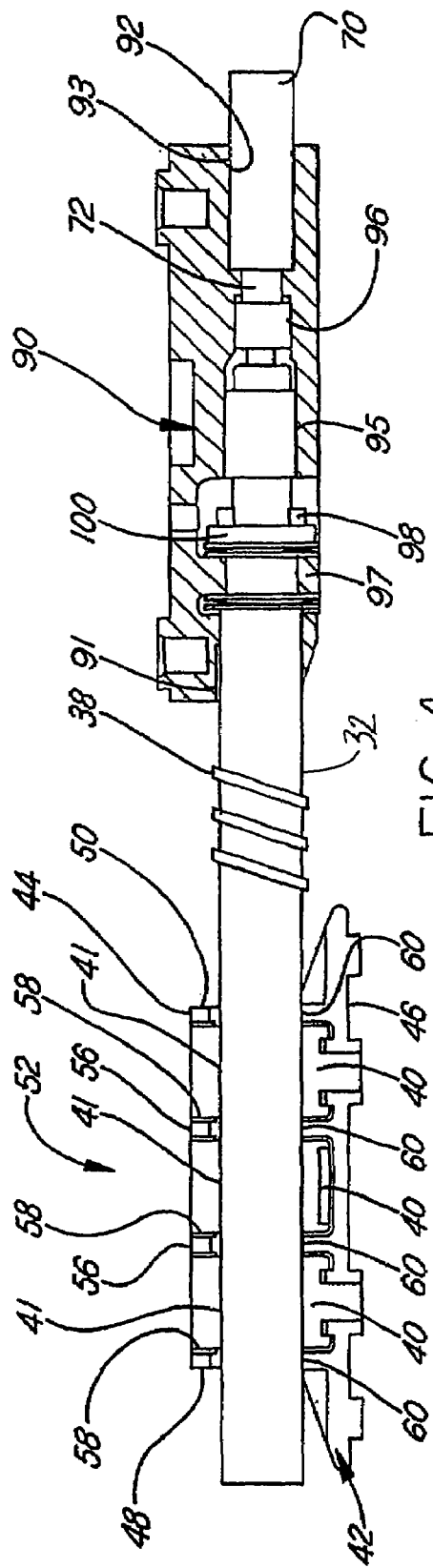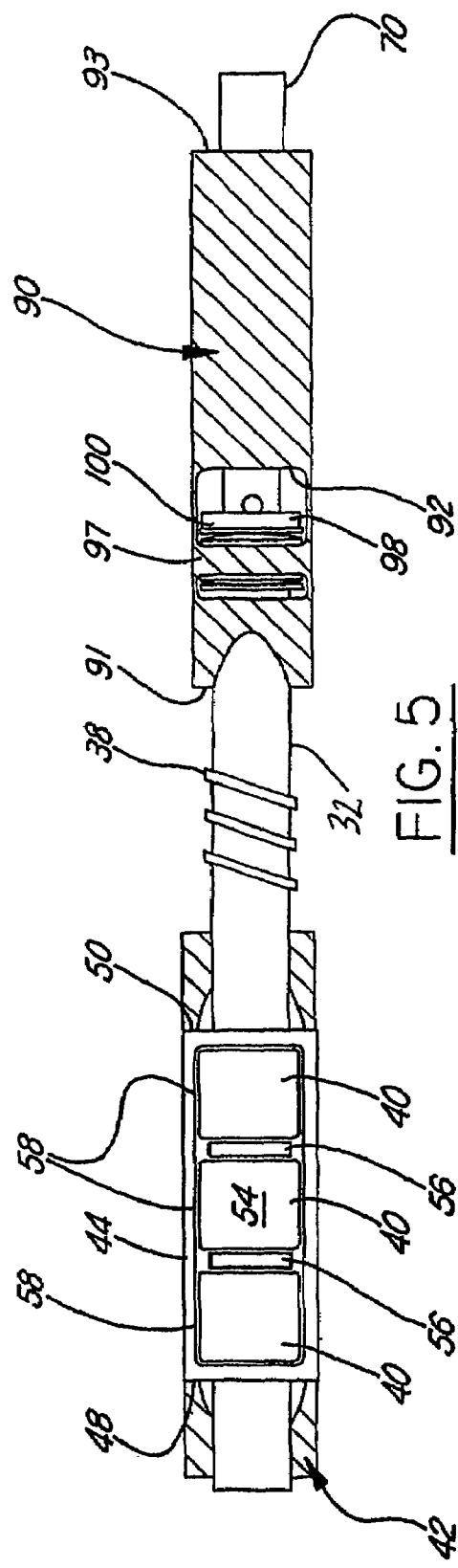

POWER SEAT TRACK HAVING A FLEXIBLE SUPPORT ASSEMBLY FOR A LEAD SCREW

BACKGROUND OF THE INVENTION

1. Field of the Invention

The invention relates to a seat track for an automotive vehicle seat, and more particularly, to a flexible support assembly for supporting a lead screw within the seat track.

2. Description of the Related Art

Automotive vehicles include seat assemblies for supporting occupants above an interior floor of the vehicle. The seat assembly typically includes a generally horizontal seat cushion and a generally upright seat back coupled to the seat cushion for selective adjustment of the seat back relative to the seat cushion between a plurality of reclined positions. The seat assembly also typically includes a track assembly coupled between the seat cushion and the floor of the vehicle to allow linear forward and rearward movement of the seat cushion along the floor of the vehicle.

The track assembly typically includes a lower track fixedly secured to the floor of the vehicle and an upper track slidably coupled to the lower track and fixedly secured to a bottom portion of the seat cushion. It is well known in the seating art to provide a powered track assembly having a lead screw mechanism driven by an electric motor for moving the upper track relative to the lower track. However, conventional powered track assemblies are known to be susceptible to binding, noise or otherwise erratic operation of the lead screw mechanism due to generally lateral or vertical loading or pre-loading of the upper track relative to the lower track. Such loading or pre-loading can be caused by dimensional variations in the floor of the vehicle, shifting of occupant weight on the seat assembly, or other vehicle accelerations or road inputs associated with normal driving conditions.

Thus, it remains desirable to provide a powered seat track assembly having a lead screw mechanism or drive assembly that provides smooth and quiet adjustment of the upper track relative to the lower track under lateral or vertical loading or pre-loading conditions associated with normal driving conditions.

SUMMARY OF THE INVENTION

According to one aspect of the invention, a track assembly is provided for selective forward and rearward adjustment of a seat assembly along a floor of an automotive vehicle. The track assembly includes a lower track fixedly secured to the floor of the vehicle and an upper track slidably coupled with the lower track and fixedly secured to the seat assembly. A shaft is rotatably supported by the upper track and has a helical thread formed thereon. A nut is threadingly engaged with the helical thread of the shaft. A cage is fixedly secured to the lower track and has a compartment for supporting the nut therein to allow relative rotational movement of the shaft relative to the nut to cause in response sliding displacement of the upper track relative to the lower track. The compartment allows a predetermined amount of movement of the nut within the compartment to prevent binding between the rigid shaft and the nut due to loading of the upper track relative to the lower track.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a side cross sectional view of the drive assembly;

FIG. 5 is a top view of the drive assembly;

FIG. 6 is a perspective view of an insulator within the drive assembly;

DETAILED DESCRIPTION OF TEE PREFERRED EMBODIMENT

Figure 1:
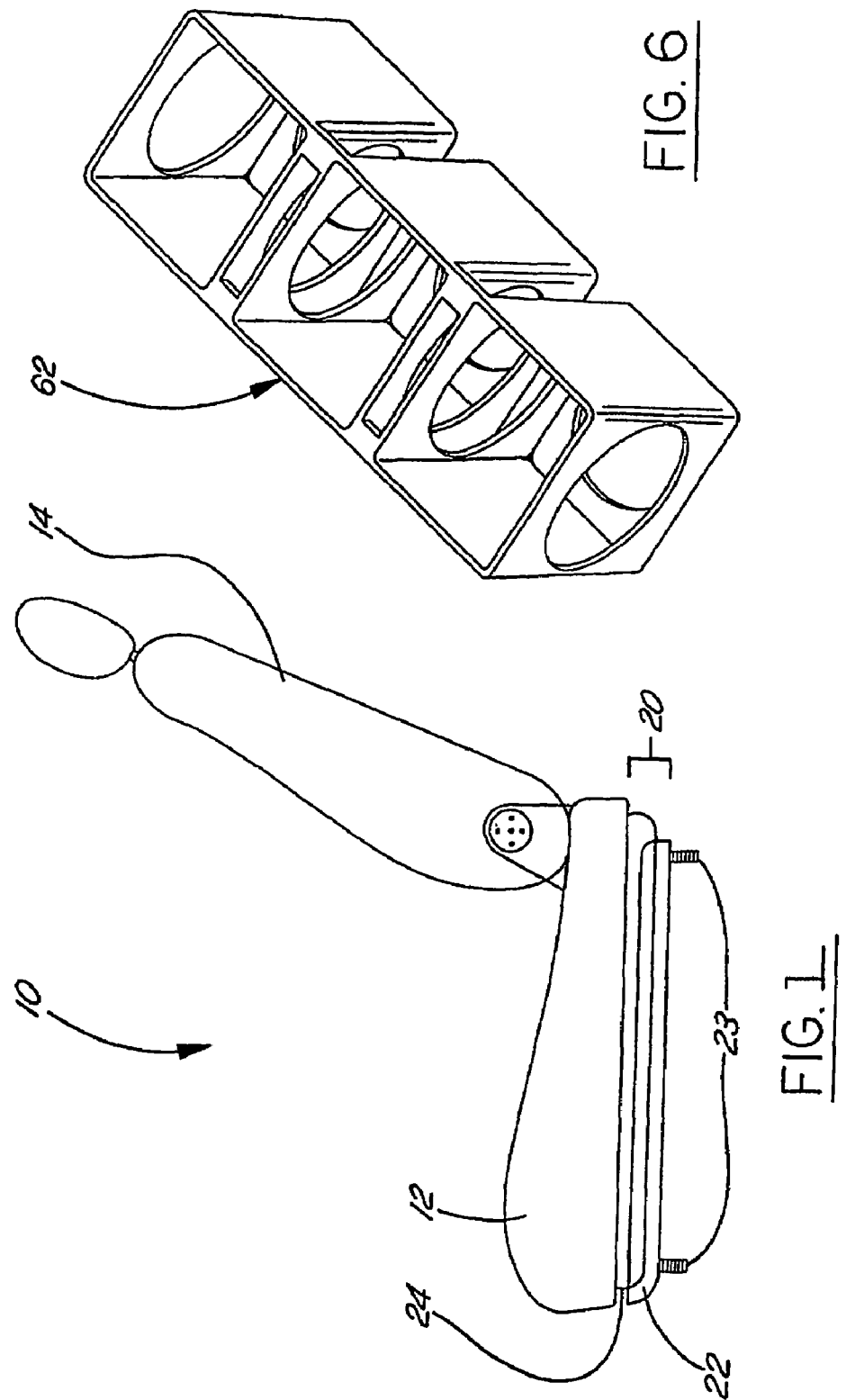
FIG. 1 is a side view of a seat assembly incorporating a powered seat track assembly according to one embodiment of the invention.

Referring to the figures, a seat assembly is generally indicated as 10 in FIG. 1 for supporting an occupant above a floor in an automotive vehicle. The seat assembly 10 includes a seat cushion 12. A track assembly 20 extends between the seat cushion 12 and the floor of the vehicle for allowing selective forward and rearward adjustment of the seat cushion 12 within the vehicle.

Figure 2:
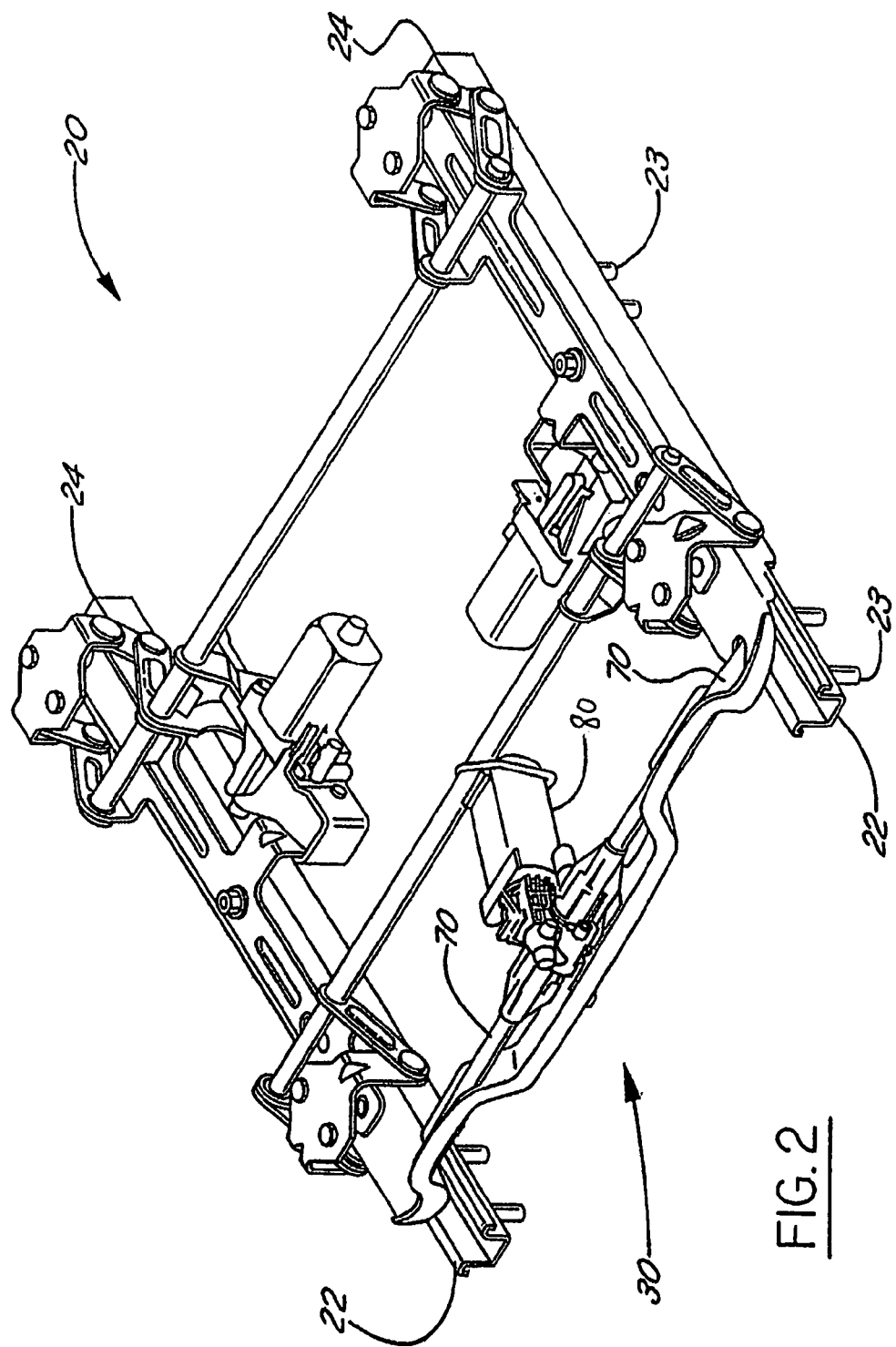
FIG. 2 is a perspective view of the powered seat track assembly.
Figure 3:
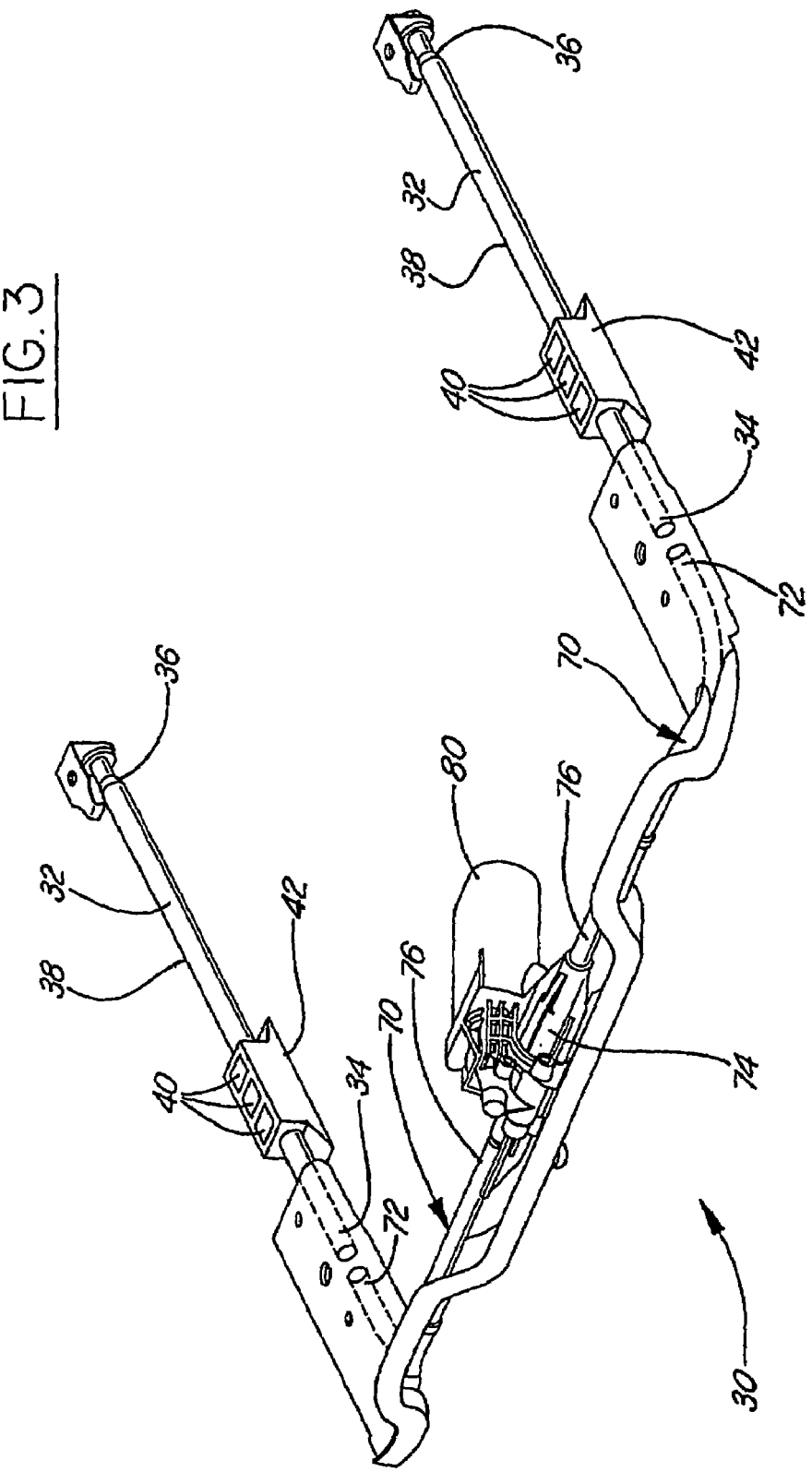
FIG. 3 is a perspective view of a drive assembly of the powered seat track assembly.
Figure 8:
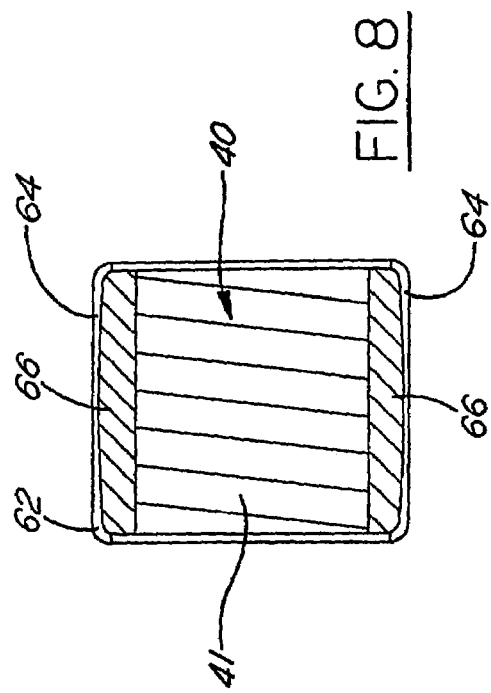
FIG. 8 is a cross sectional view of a nut in the drive assembly.
Figure 9:
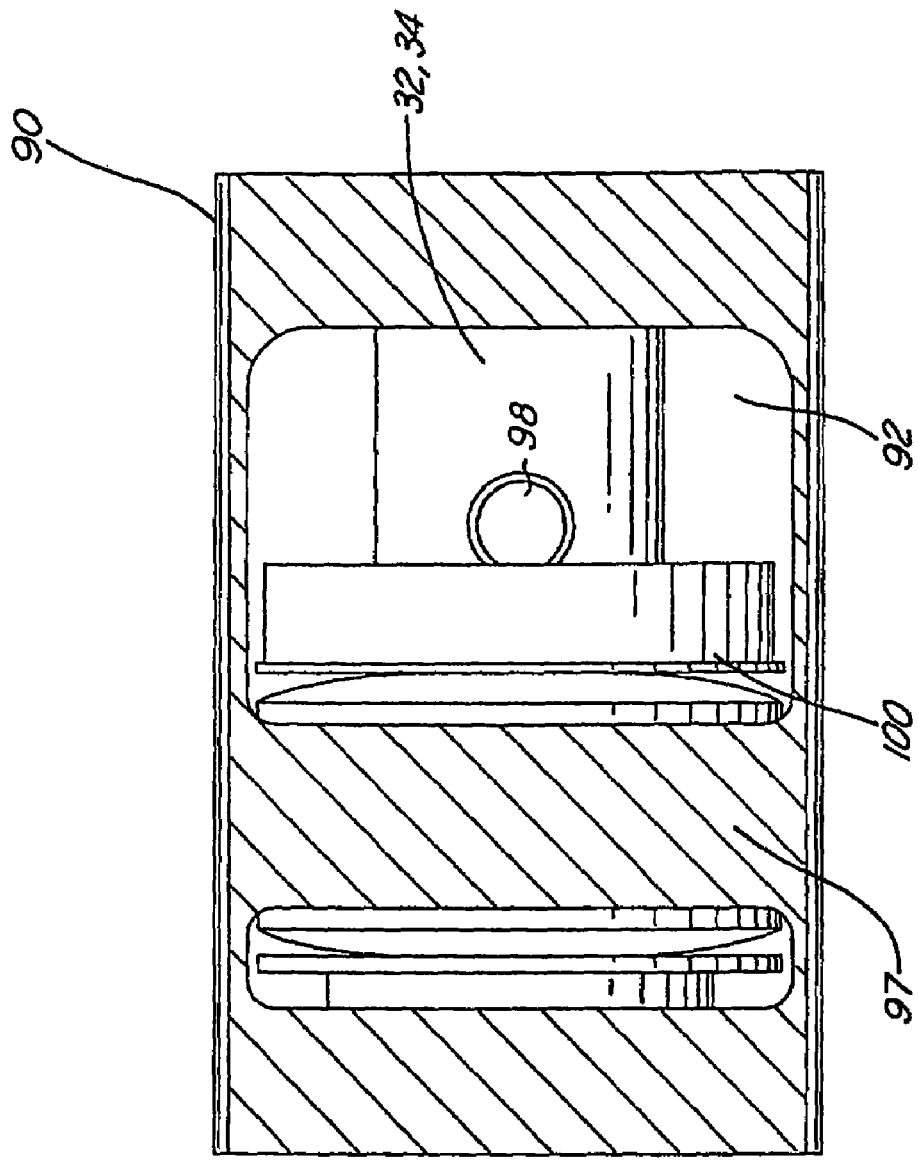
FIG. 9 is a partial view of a guide in the drive assembly.

Referring to FIGS. 2, 3 and 8, the track assembly 20 includes a lower track 22 fixedly secured to the floor of the vehicle by bolts 23. An upper track 24 is fixedly secured to the bottom of the seat cushion 12 and slidably coupled to the lower track 22 for forward or rearward sliding adjustment of the seat cushion 12 relative to the floor of the vehicle. Described in greater detail below, a drive assembly 30 is coupled between the lower 22 and upper 24 tracks for forwardly or rearwardly driving the upper track 24 relative to the lower track 22 in response to a rotary input.

The drive assembly 30 includes a rigid shaft 32 having first 34 and second 36 ends rotatably supported by the upper track 24 for rotation of the rigid shaft 32 about a longitudinal axis of the rigid shaft 32. The rigid shaft 32 includes a generally continuous helical thread 38 formed between the first 34 and second 36 ends of the rigid shaft 32. The drive assembly 30 includes at least one nut 40. Each nut 40 includes a helically threaded bore 41 for engaging the helical thread 38 of the rigid shaft 32 during rotation of the rigid shaft 32 relative to each nut 40. The engagement of the helical threads 38 and the threaded bore 41 converts rotational torque applied to the rigid shaft 32 into an axial thrust load applied to the rigid shaft 32. Each nut 40 is secured to the lower track 22 by a cage 42. The cage 42 prevents rotation of each nut 40 about the longitudinal axis of the rigid shaft 32 and axially secures each nut 40 to the lower track 22 so that the axial thrust load resulting from rotation of the rigid shaft 32 relative to each nut 40 causes axial displacement of the rigid shaft 32 and the upper track 24 relative to the lower track 22. The direction of rotation of the rigid shaft 32 determines the forward or rearward axial thrust load upon the rigid shaft 32 and, hence, the forward or rearward displacement of the upper track 24 relative to the lower track 22. Preferably, as shown in the figures, a plurality of nuts 40 is included to increase the load carrying capacity of the drive assembly 30.

Referring to FIGS. 4 and 5, a cage 42 extends between top 44 and bottom 46 surfaces and first and second ends 48, 50. Bolts (not shown) extend through the lower track 22 and the bottom surface 46 of the cage 42 to fixedly secure the cage 42 to the lower track 22. An opening 52 is formed in the top surface 44 defining a receptacle 54 within the cage 42. A plurality of walls 56 divide the receptacle 54 into compartments 58. Each compartment 58 nestingly supports one nut 40 therein. A bore 60 extends through the first and second ends 48, 50 and the walls 56 of the cage 42 to allow the rigid shaft 32 to pass therethrough. An elastic insulator 62, shown in FIG. 6, is adapted to be sandwiched between the cage 42 and the nuts 40 to minimize vibration and noise. Preferably, the elastic insulator 62 is molded from an elastomeric material. In assembly, the nuts 40 are supported within the respective compartments 58 such that the threaded bores 41 are generally aligned with the bore 60 in the cage 42. The rigid shaft 32 extends through the bore 60 of the cage 42 and remains continuously threadingly engaged with the threaded bores 41 of the nuts 40. The nuts 40 remain movable within the compartment 58 to accommodate movement due to spacing between the lower 22 and upper 24 tracks and to help prevent binding between the rigid shaft 32 and the nuts 40 due to such movement.

Figure 7:
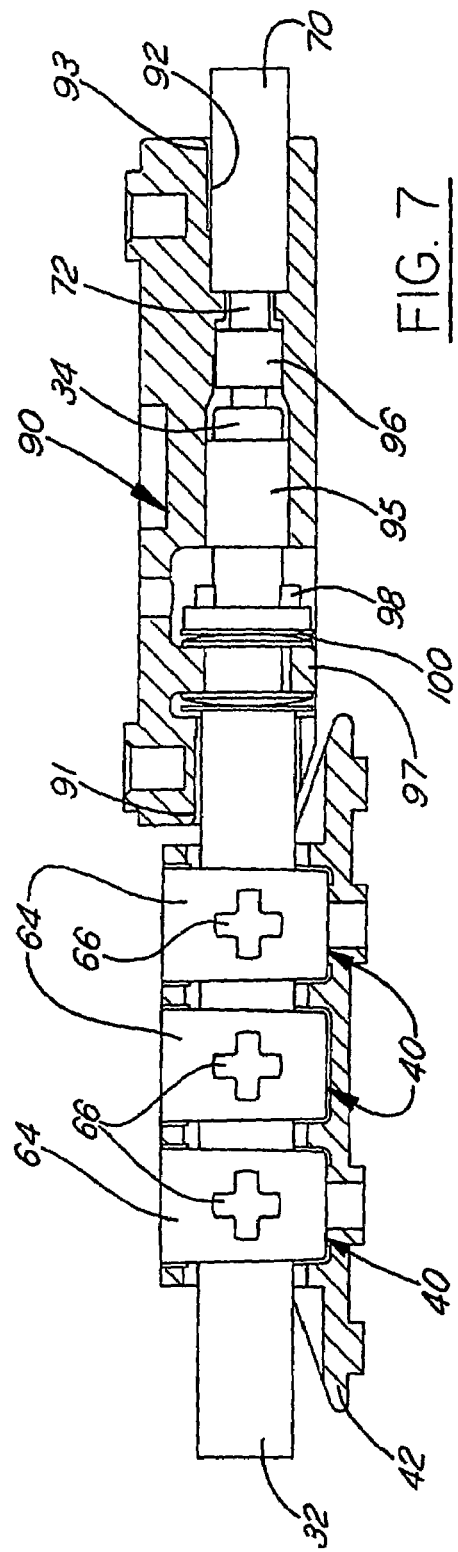
FIG. 7 is a side view of the drive assembly.

Referring to FIGS. 7 and 8, each nut 40 includes opposite lateral sides 64 having a gimbaled or raised bump 66 to allow angular movement of the nut 40 relative to the cage 42 and the rigid shaft 32 about an axis (not shown) generally normal to the longitudinal axis of the rigid shaft 32 to accommodate movement due to spacing between the lower 22 and upper 24 tracks and to help prevent binding between the rigid shaft 32 and the nuts 40 due to such movement.

Referring to FIGS. 3, 4, 5, 7 and 9, the drive assembly 30 also includes a flexible shaft 70 extending between a first end 72 coupled to the first end 34 of the rigid shaft 32 and a second end 76 coupled to a transmission 74 for translating the rotary input into rotational movement of the flexible shaft 70. The first ends 34, 72 of the rigid shaft 32 and flexible shaft 70 are in splined engagement or keyed in a rotary sense such the rigid shaft 32 rotates with the flexible shaft 70. Preferably, the rotary input is provided by an electric motor 80, as known by those of ordinary skill in the art. Alternatively, a hand wheel may be coupled to the transmission 74 to allow manual rotary input by the occupant of the seat assembly 10.

The first ends 34, 72 of the rigid shaft 32 and flexible shaft 70 are axially held together by a housing or guide 90 fixedly secured to the upper track 24. The guide 90 includes a guide bore 92 extending between first 91 and second 93 guide ends for receiving the first ends 34, 72 of the rigid 32 and flexible 70 shafts, respectively, therethrough. A bead 95, 96 is fixedly secured to each first end 34, 72 of the rigid 32 and flexible shafts 70 to help guide the first ends 34, 72 through the guide bore 92 and into splined engagement. The beads 95, 96 also help to keep the first ends 34, 72 aligned during rotation of the rigid 32 and flexible 70 shafts.

The guide 90 also includes an abutment wall 97 formed within a portion of the guide bore 92 between the first 91 and second 93 guide ends. The first end 34 of the rigid shaft 32 extends through the guide bore 92 in the first guide end 91 and protrudes beyond the abutment wall 97 into a middle portion of the guide bore 92. While in the middle portion of the guide bore 92, the first end 34 of the rigid shaft 32 is presented for splined engagement with the first end 72 of the flexible shaft 70. A retaining pin 98 extends through the rigid shaft 32 between the abutment wall 97 and the first end 34 of the rigid shaft 32 to retain the first end 34 of the rigid shaft 32 within the guide bore 92. A spring washer 100 is mounted on the rigid shaft 32 between the abutment wall 97 and the retaining pin 98 for providing an axial pre-load between the threaded bores 41 of the nuts 40 and the helical thread 38 of the rigid shaft 32.

In use, the occupant of the seat assembly 10 operates a switch (not shown), as commonly known by those skilled in the art, to energize the electric motor 80. The electric motor 80 provides the rotary input to the transmission 74 to cause rotational movement of the flexible shaft 70. With the first ends 34, 72 of the rigid 32 and flexible 70 shafts in splined engagement, the rigid shaft 32 rotates with the flexible shaft 70. The helical thread 38 of the rigid shaft 32 threadingly engages the threaded bores 41 of the nuts 40 to cause axial displacement of the rigid shaft 32 relative to the nuts 40 and, in turn, sliding movement of the upper track 24 relative to the lower track 22. The direction of the sliding movement of the upper track 24 relative to the lower track 22 depends on the direction of rotation of the rigid shaft 32 relative to the nuts 40.

A predetermined amount of free movement of the nuts 40 within the respective compartments 58 due in combination to the opening 52 in the top surface 44 of the cage 42, the raised bumps 66 on the lateral sides 64 of the nuts 40, and the elastic insulator 62 allows off-axis movement between the lower 22 and upper 24 tracks without binding or hindering threaded engagement between the rigid shaft 32 and the nuts 40.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A track assembly (20) for providing selective forward and rearward adjustment of a seat assembly (10) along a floor of an automotive vehicle, the track assembly (20) comprising:

a lower track (22) adapted to be secured to the floor of the vehicle;

an upper track (24) adapted to be secured to the seat assembly (10), the upper track (24) slidably coupled with the lower track (22);

a rigid shaft (32) having a helical thread (38) formed thereon, the rigid shaft (32) rotatably supported by the upper track (24);

at least one nut (40) engaged with the helical thread (38) of the rigid shaft (32), the at least one nut (40) having raised bumps (66) disposed on opposing lateral sides (64) thereof; and a cage (42) secured to the lower track (22), the cage (42) having a hole (52) formed in a top surface (44) of the cage (42) defining a receptacle (54) for receiving the at least one nut (40), the receptacle (54) including a plurality of walls (56) spaced from each other defining at least one compartment (58) for supporting the at least one nut (40) therein, and a bore (60) formed in end walls (48, 50) and the plurality of walls (56) of the cage (42) for allowing the rigid shaft (32) to extend therethrough, the cage (42) allowing relative rotational movement of the rigid shaft (32) relative to the at least one nut (40) for displacing the upper track (24) relative to the lower track (22), the at least one compartment (58) interacting with the raised bumps (66) of the at least one nut (40) thereby allowing a predetermined amount of movement of the at least one nut (40) within the at least one compartment (58) for preventing binding between the rigid shaft (32) and the at least one nut (40) due to loading of the upper track (24) relative to the lower track (22).

2. The track assembly (20) of claim 1 wherein the at least one nut (40) comprises a plurality of nuts (40).

3. The track assembly (20) of claim 1 further including a flexible shaft (70) connected to a transmission (74) for transferring rotational input into rotational movement of the flexible shaft (70).

4. The track assembly (20) of claim 1 wherein a first end (72) of the flexible shaft (70) is connected to a first end (34) of the rigid shaft (32).

5. The track assembly (20) of claim 4 wherein the rigid and flexible shafts (32, 70) include a bead (95, 96) formed thereon proximate the first ends (34, 72) for aligning the rigid (32) and flexible (70) shafts to maintain engagement during rotation.

6. The track assembly (20) of claim 1 further including a housing (90) secured to the upper track (24) for axially connecting the rigid shaft (32) and the flexible shaft (70).

7. The track assembly (20) of claim 6 wherein the housing (90) includes a guide bore (92) formed between ends (91, 93) of the housing (90) for receiving the first ends (34, 72) of the rigid (32) and flexible (70) shafts.

8. The track assembly (20) of claim 7 wherein the housing (90) includes an abutment wall (97) formed within the guide bore (92) between the ends (91, 93) of the housing (90).

9. The track assembly (20) of claim 8 including a retaining pin (98) extending through the rigid shaft (32) in a position between the abutment wall (97) and the first end (34) of the rigid shaft (32) for maintaining the rigid shaft (32) within the guide bore (92).

10. The track assembly (20) of claim 9 including a spring washer (100) mounted about the rigid shaft (32) between the abutment wall (97) and the retaining pin (98) for providing an axial preload between the at least one nut (40) and the helical thread (38) of the rigid shaft (32).

11. The track assembly (20) of claim 1 further including an elastic insulator (62) disposed between the cage (42) and at least one nut (40) for minimizing noise and vibration between the at least one nut (40) and cage (42).

12. A track assembly (20) for providing selective forward and rearward adjustment of a seat assembly (10) along a floor of an automotive vehicle, the track assembly (20) comprising:

a lower track (22) adapted to be secured to the floor of the vehicle;

an upper track (24) adapted to be secured to the seat assembly (10), the upper track (24) slidably coupled with the lower track (22);

a rigid shaft (32) having a helical thread (38) formed thereon, the rigid shaft (32) rotatably supported by the upper track (24);

a flexible shaft (70) connected to a transmission (74) at one end and to the rigid shaft (32) at another end;

at least one nut (40) engaged with the helical thread (38) of the rigid shaft (32), the at least one nut (40) having raised bumps (66) disposed on opposing lateral sides (64) thereof; and a cage (42) secured to the lower track (22), the cage (42) having at least one compartment (58) for supporting the at least one nut (40) therein, the cage (42) allowing relative rotational movement of the rigid shaft (32) relative to the at least one nut (40) for displacing the upper track (24) relative to the lower track (22), the at least one compartment (58) interacting with the raised bumps (66) of the at least one nut (40) thereby allowing a predetermined amount of movement of the at least one nut (40) within the at least one compartment (58) for preventing binding between the rigid shaft (32) and the at least one nut (40) due to loading of the upper track (24) relative to the lower track (22).

* * * * *